(12) United States Patent
Ortega et al.

(10) Patent No.: US 9,886,190 B2
(45) Date of Patent: Feb. 6, 2018

(54) GESTURE DISCERNMENT AND PROCESSING SYSTEM

(71) Applicant: The Florida International University Board of Trustees, Miami, FL (US)

(72) Inventors: Francisco Raul Ortega, Miami, FL (US); Naphtali David Rishe, Miami, FL (US); Armando Bennett Barreto, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 623 days.

(21) Appl. No.: 14/555,854

(22) Filed: Nov. 28, 2014

(65) Prior Publication Data

US 2016/0091977 A1    Mar. 31, 2016

Related U.S. Application Data

(60) Provisional application No. 62/055,749, filed on Sep. 26, 2014.

(51) Int. Cl.
*G06F 17/00* (2006.01)
*G06N 5/00* (2006.01)
(Continued)

(52) U.S. Cl.
CPC ..... *G06F 3/04883* (2013.01); *G06K 9/00335* (2013.01); *G06K 9/6296* (2013.01); *G06F 2203/04808* (2013.01)

(58) Field of Classification Search
USPC ........................................................ 706/45
See application file for complete search history.

(56) References Cited

U.S. PATENT DOCUMENTS 5,920,857 A * 7/1999 Rishe ................ G06F 17/30483
5,997,482 A * 12/1999 Vaschillo ........... A63B 71/0686
600/484

(Continued)

OTHER PUBLICATIONS

An Extension of the Interpreter Pattern to Define Domain-Parametric Rewriting Systems Lorenzo Capra; Vincenzo Stile 2013 15th International Symposium on Symbolic and Numeric Algorithms for Scientific Computing Year: 2013 pp. 185-192 IEEE Conference Publications.*

(Continued)

*Primary Examiner* — Michael B Holmes
(74) *Attorney, Agent, or Firm* — Saliwanchik, Lloyd & Eisenschenk

(57) ABSTRACT

Techniques and systems are described that enable improved gesture discernment from input devices, as well as simplified modeling and processing of gestures by application software layers. Given data (e.g., about movements, actions, or events) gathered from input devices, techniques and systems allow gestures to be discerned and inferred more formally and reliably, and processed more easily by an application layer. A gesture interpreter is provided that, in response to receiving an activation input data from an input device, instantiates a high-level Petri Net instance, executes the high-level Petri Net instance, and returns, to an application layer, an outcome gesture indicative of a terminal node in a path of the high-level Petri Net instance being traversed during the execution of the high-level Petri Net instance.

20 Claims, 6 Drawing Sheets

(51) Int. Cl.
*G06F 3/0488* (2013.01)
*G06K 9/00* (2006.01)
*G06K 9/62* (2006.01)

(56) References Cited

U.S. PATENT DOCUMENTS

| | | | | |
|---|---|---|---|---|
| 6,067,357 | A * | 5/2000 | Kishinsky | H04M 3/5183 379/265.02 |
| 6,178,239 | B1 * | 1/2001 | Kishinsky | H04M 3/5183 379/221.15 |
| 6,795,825 | B2 * | 9/2004 | Rishe | G06F 17/30392 |
| 9,734,161 | B2 * | 8/2017 | Rishe | G06F 17/30241 |
| 2002/0107840 | A1 * | 8/2002 | Rishe | G06F 17/30392 |
| 2014/0236882 | A1 * | 8/2014 | Rishe | G06F 17/30241 706/50 |
| 2014/0280319 | A1 * | 9/2014 | Rishe | G06F 17/30241 707/769 |
| 2015/0373065 | A1 * | 12/2015 | Holmquist | H04L 65/403 715/753 |
| 2016/0091977 | A1 * | 3/2016 | Ortega | G06F 3/04883 345/173 |
| 2016/0253847 | A1 * | 9/2016 | Ullrich | G08G 1/143 705/13 |
| 2017/0102860 | A1 * | 4/2017 | Ullrich | G06F 3/04847 |
| 2017/0200249 | A1 * | 7/2017 | Ullrich | G06Q 50/30 |
| 2017/0316033 | A1 * | 11/2017 | Rishe | G06F 17/30241 |

OTHER PUBLICATIONS

A generic framework for executable gestural interaction models Romuald Deshayes; Tom Mens; Philippe Palanque 2013 IEEE Symposium on Visual Languages and Human Centric Computing Year: 2013 pp. 35-38 IEEE Conference Publications.*

Modeling and recognition of hand gesture using colored Petri nets Yanghee Nam; Nwangyun Wohn; Hyung Lee-Kwang IEEE Transactions on Systems, Man, and Cybernetics—Part A: Systems and Humans Year: 1999, vol. 29, Issue: 5 pp. 514-521 IEEE Journals & Magazines.*

Translation from Petri nets into Boolean equations for the algebraic design of logic controllers M. Díaz-Rodríguez; E. López-Mellado; P-A. Brameret; J-M. Roussel 2011 8th International Conference on Electrical Engineering, Computing Science and Automatic Control Year: 2011 pp. 1-6 IEEE Conference Publications.*

Kin, K. et al., "Proton++: A Customizable Declarative Multitouch Framework," UIST '12, Oct. 7-10, 2012, 10 pages.

Lu, H. et al., "Gesture Coder: A Tool for Programming Multi-Touch Gestures by Demonstration," CHI '12, May 5-10, 2012, 10 pages.

Ortega, F. R. et al., "PeNTa: Formal Modeling for Multi-touch Systems Using Petri Net," Human-Computer Interaction, Part I, HCII 2014, LNCS 8510, pp. 361-372.

Ortega, F. R. et al., "Exploring Modeling Language for Multi-Touch Systems using Petri Nets," ITS '13, Oct. 6-9, 2013, pp. 361-364.

Spano, L. D. et al., "GestIT: A Declarative and Compositional Framework for Multiplatform Gesture Definition," EICS '13, Jun. 24-27, 2013, pp. 187-196.

* cited by examiner

Multi-Touch Data Structure (Token TK)

| Name | Description |
|---|---|
| id | Unique Multi-Touch Identification |
| Tid | Touch Entry Number |
| x | X display coordinate |
| y | Y display coordinate |
| state | Touch states (e.g., DOWN, MOVE, UP) |
| holdTime | How many milliseconds since last rest |
| prev | Previous sample |
| get(Time t) | Get previous sample at time t |
| tSize | Size of sample buffer |
| msg | String variable for messages |

FIG. 4A

GESTURE DISCERNMENT AND PROCESSING SYSTEM

CROSS-REFERENCE TO RELATED APPLICATION

This application claims the benefit of U.S. Provisional Patent Application No. 62/055,749, filed Sep. 26, 2014.

BACKGROUND

As the field of Human-Computer Interaction (HCI) has matured, the development of new categories of gestural input devices (e.g., multi-touch displays, full body motion sensors, gyroscopes, and accelerometers) has become a common occurrence. However, as the type and number of these devices increases, the software engineering problems posed by processing their data become increasingly complex.

BRIEF SUMMARY

Techniques and systems are described that enable improved gesture discernment from input devices, as well as simplified modeling and processing of gestures by application software layers. Given data (e.g., about movements, actions, or events) gathered from input devices, techniques and systems allow gestures to be discerned and inferred more formally and reliably, and processed more easily by an application layer. Certain techniques and systems enable distributed processing scenarios across multiple types of gestural input device. Certain techniques and systems enable parallel processing of gestures. Certain techniques and systems may be applicable to, for example, graphical gesture modeling tools, programming frameworks or code libraries, or languages.

In some implementations, a gesture interpreter is provided that, in response to receiving an activation input data from an input device, instantiates a high-level Petri Net instance, executes the high-level Petri Net instance, and returns, to an application layer, an outcome gesture indicative of a terminal node in a path of the high-level Petri Net instance being traversed during the execution of the high-level Petri Net instance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4A-4B show an example implementation for multi-touch display device gesture processing.

DETAILED DISCLOSURE

Figure 1:
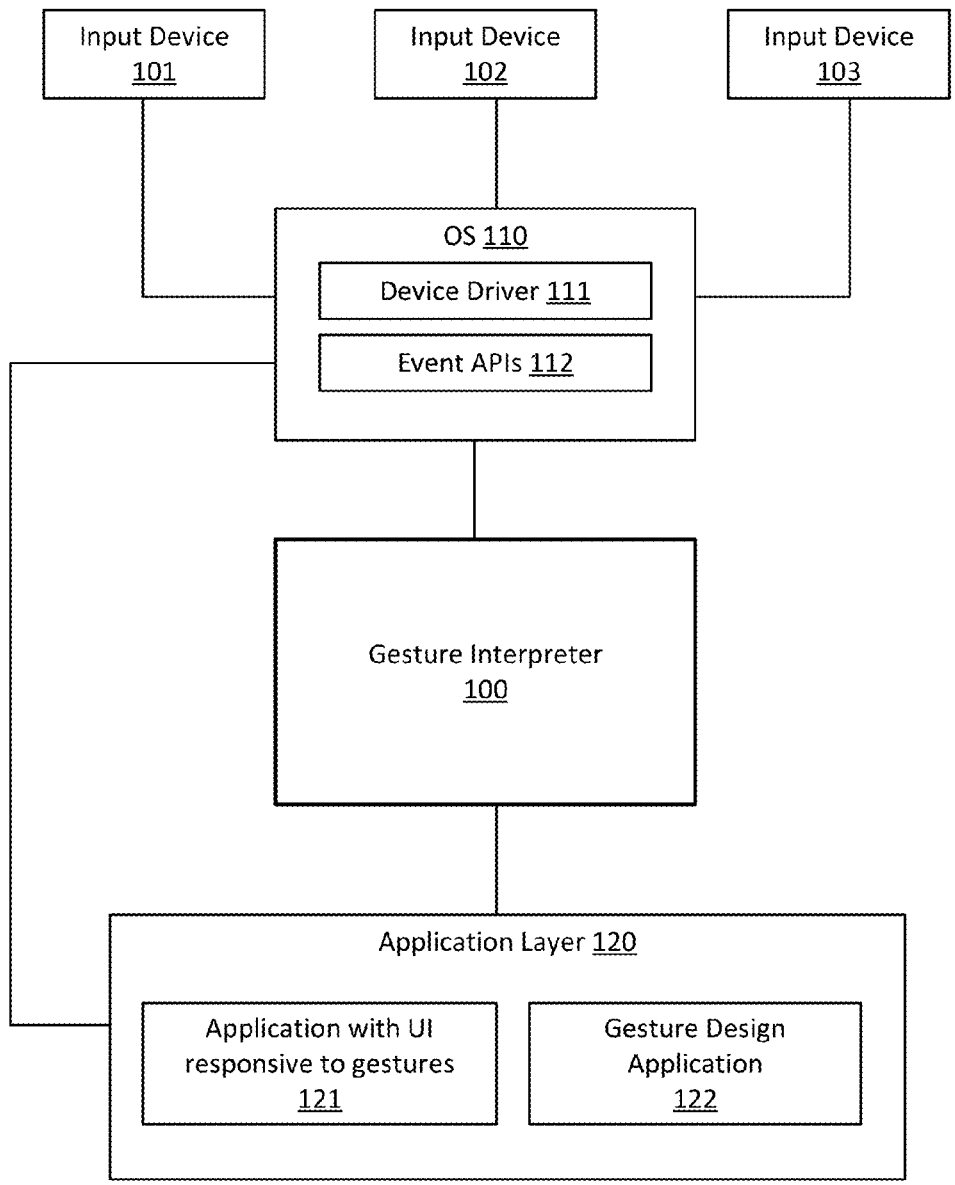
FIG. 1 shows an example component environment in which techniques and systems may be enabled in some implementations.

Techniques and systems are described that enable improved gesture discernment from input devices, as well as simplified modeling and processing of gestures by application software layers. Given data (e.g., about movements, actions, or events) gathered from input devices, techniques and systems allow gestures to be discerned and inferred more formally and reliably, and processed more easily by an application layer. Certain techniques and systems enable distributed processing scenarios across multiple types of gestural input device. Certain techniques and systems enable parallel processing of gestures. Certain techniques and systems are applicable to, for example, graphical gesture modeling tools, programming frameworks or code libraries, or languages.

A "gesture" is a form of communication in which bodily actions communicate particular messages. Sometimes gestures are accompanied by vocal communications. Gestures refer to a full range of human body movements, including digits and limbs, hands, face, eye, and full-body positioning. In some cases, gestures are composed of multiple body movements, e.g., multiple actions or movements of the same body part or simultaneous or serial movement of different body parts. It should be noted that these are merely examples, and the range of human gestures is almost limitless; disclosures herein pertain to systems and techniques for discerning and processing gestures rather than being limited to particular gesture types.

The basic actions of a gesture are sometimes determined by the type of input device. For example, a capacitive display device registers a few primitive actions as input, such as an object (e.g., a finger or stylus) contacting the surface, moving along the surface, and leaving the surface. A multi-touch capacitive display registers these action primitives in more than one place on the display at a time. For the multi-touch kind of input device, gestures are made up of permutations of a relatively few action primitives.

In some cases, these action primitives are processed into gestures such as "zoom" or "swipe" or "click" by the operating system (OS). Functions or programming interfaces of the OS may then broadcast events that indicate when a gesture is occurring. Application layer code may subscribe to the events and react to the events, as desired, with their own application-specific operations.

An "input device" is a device for detecting the bodily actions, movements, or events that may be associated with one or more gestures. Sometimes, an input device capable of detecting the actions or events composing a gesture may also be referred to herein as a "gesture input device."

As noted, a gesture may sometimes be composed of more than one physical action or body movement, and the multiple physical actions can occur with respect to the same input device or on multiple different input devices. For example, a "click" or select action on a touch display device can involve a single action on the touch display device, i.e., the user contacting the surface of the display with a finger atop an operative user interface element like an icon, link, button, menu, etc. A "zoom" gesture may involve multiple actions and multiple body movements, e.g., two fingers that both contact the surface of the display and move relative to one another.

Other types of gestures might involve multiple actions detected across multiple input devices. For example, the meaning of a "hand wave" gesture may differ based on cultural norms (e.g., Southern European vs. Northern European) with respect to the speed of the wave. Therefore, to be culturally sensitive, proper gesture determination may depend on the input from multiple devices in that the hand wave involves, for example, movement recognition using 3D image-based recognition and a determination of velocity using another sensor. Another example might include a touch screen gesture that works differently based on the orientation of the screen with respect to the user.

Some approaches to determining and processing gestures center on interacting with existing user interface programming models, which may be predominantly event-driven. For example, the Microsoft Windows® operating system generates a distinct "event" for each mouse movement, button press, etc. These approaches may be sufficient when the gesture is discrete enough, i.e., when it has very few possible outcomes. When a user moves a computer mouse, for example, in many cases it is not important where the user moves the mouse until it arrives at a final destination and a mouse button is clicked or released.

However, a complex gesture that may involve multiple interactions with a single device or across multiple input devices, is more difficult for application software layers to process. The standard event-driven programming models suffer from several shortcomings that increase in importance as the complexity of the gestures increases. First, a complex gesture may be better represented as a series of actions occurring over time; therefore, an application layer may need to provide feedback at pivotal points during the course of the gesture. However, in some event-driven programming models, the outcome may be a single event indicative of the gesture; or, the outcome may be multiple lower-level events from which the gesture must be discerned with programming logic. Deviating from the standard event-driven programming models to provide intermediate feedback may require the application layer to process low-level device events. This mixture of gesture definition code and feedback code results in code that is less maintainable and portable across different application layers.

The first problem is compounded as the number of actions or states to track in a gesture increases, as is common with, for example, multi-touch display input devices and full-body gesture input devices. Furthermore, particularly in cases where multiple types of gestural input device are processed, the application layer programming logic that responds to events in standard event-driven programming models is sometimes layered across different functions and different code modules. Consequently, the application layer may be programmed with a convoluted array of interacting data structures, signaling flags, and cross-module messaging functions. This can lead to complex and fragmented code that is complex to understand, maintain, and modify, and that has a higher incidence of programming errors or "bugs." This kind of code is often referred to in the industry as "spaghetti code."

Further, many gestures are composed of the same set of initiating actions. For example, a touch of a single finger on a multi-touch device may result in a variety of different ultimate gestures, e.g., an activation of an icon, a "swipe," or in cases when a second finger is touched to the device, a "zoom in" or "zoom out" gesture. In other words, the beginning action determines a finite set of outcome gestures, but in many cases that set is very large and evolves as additional actions are processed. Programming logic to handle the various permutations in a standard event-driven model can quickly become unwieldy.

Certain techniques and systems described herein represent a novel improvement in the technological art of gesture input device discernment and processing. The disclosed techniques and systems have technical features that, in many cases, improve certain technical problems with standard event-driven programming models. For example, the use of a mathematically sound mechanism for processing action primitives means that gesture processing can yield a definitive gesture outcome. Also, existing methods' use of "spaghetti code" may lead to inconclusive outcomes, which may result in "bug"-filled and unreliable programming logic. Relatedly, the disclosed techniques allow for easier design and modeling of a gesture (see, for example, the ease of modifying an existing model in the example that includes a "BACK-TILTED SWIPE"). Applications that use or connect to implementations of the disclosed systems may contain improved programming logic, since the feedback mechanisms providing gesture output and intermediate gesture states are definitive and simplified.

Furthermore, techniques and systems enable multiple input devices to be integrated into a single mechanism by allowing a simplified and flexible framework. Because models built on the disclosed techniques are mathematically sound, gesture discernment and processing may even be conducted in parallel across multiple processors, asynchronously, and involving multiple input device types.

FIG. 1 shows an example component environment in which techniques and systems may be enabled in some implementations. According to certain implementations, a gesture interpreter 100 is provided which performs gesture discernment based on input from one or more input devices (e.g., 101-103), and communicates relevant events and information for use by applications.

Gesture interpreter 100 may take the form of, for example, a software framework, programming library, component, or service. In some cases, the gesture interpreter 100 resides on a client device. In some cases, the gesture interpreter 100 resides on another device or processing system or component, and is accessible via network or other communications mechanism.

Input devices 101-103 are devices that collect data detecting movements or other information associated with one or more gestures. An input device is a device for detecting bodily actions, bodily movements, device movements, or other events that may be associated with one or more gestures. Input devices may detect gestures directly, as for example a multi-touch display does. Often a gesture input device demarcates a working space or working field in which the actions are conducted; that field may be a direct mapping to a physical field or a relative mapping to a virtual field.

Gesture input devices fall into a number of different categories, each of which has numerous device types, vendors, and implementations. Most familiar of the gesture input devices are controller-based input devices. These controllers act as an extension of the body so that movements may be captured by software. A mouse is a type of controller-based input device, in that the movement of a pointer across a virtual space is being correlated with the movement of the user's hand holding the mouse controller. Multi-touch display devices are another example, as the tracking or movement of one or more fingers is correlated not only with physical movements across a virtual space, but may also have different semantic content in the context of different virtual spaces (e.g., a "flick" gesture may indicate an item of content should be deleted in one application, but marked "complete" in another).

Another category of input device includes various kinds of gesture devices for image-based recognition. Image-based recognition uses optical (light sensitive) sensors to detect motion. Image-based recognition devices may vary by the ability to and method of sensing motion in three dimensions (3D). For example, a stereo camera input device uses two cameras, for example an RGB camera and a depth camera, whose physical location is known to one another to get a 3D output by the camera. As another example, a depth-aware camera can use structured light (e.g., strobe flashes) to generate a depth map of what is being seen through the camera at a short range; short range detection (e.g., of hand gestures) can be performed using this 3D representation. An example of image-based recognition is the Microsoft Kinect®, which uses various camera sensors to detect full-body gestures and perform facial recognition. Some full-body gesture recognition systems use "joint" mapping to determine body positioning based on bends in the limbs.

However, sometimes an input device may also detect other kinds of information that is useful in discerning a gesture. Discerning a kind of gesture may in some cases depend on other sensors that may not necessarily be thought of as gesture input devices. For example, some kinds of gesture may depend not only on what a user is doing, but also on external factors like the speed the device is moving. If a user were driving an automobile while wearing a device that senses eye movement tracking (such as Google® Glass), a quick movement of the eye to the top right corner might not be an indication to perform a gesture on the device, but might instead be a quick check by the user of the automobile's rear view mirror. In a case such as this, gesture recognition might include input from not only the eye movement tracking device, but also the device's GPS sensor (for speed detection).

Another type of input device may be a device sensor that detects positioning or relative motion of the device. An accelerometer, which measures proper acceleration, is one example of such an input device. An accelerometer may be used, for example, for detecting free-fall or collision (i.e., rapid deceleration) of a device or the orientation of the device. A gyroscope, which measures orientation based on the principles of angular momentum, is another example of a device sensor input device.

Figure 3:
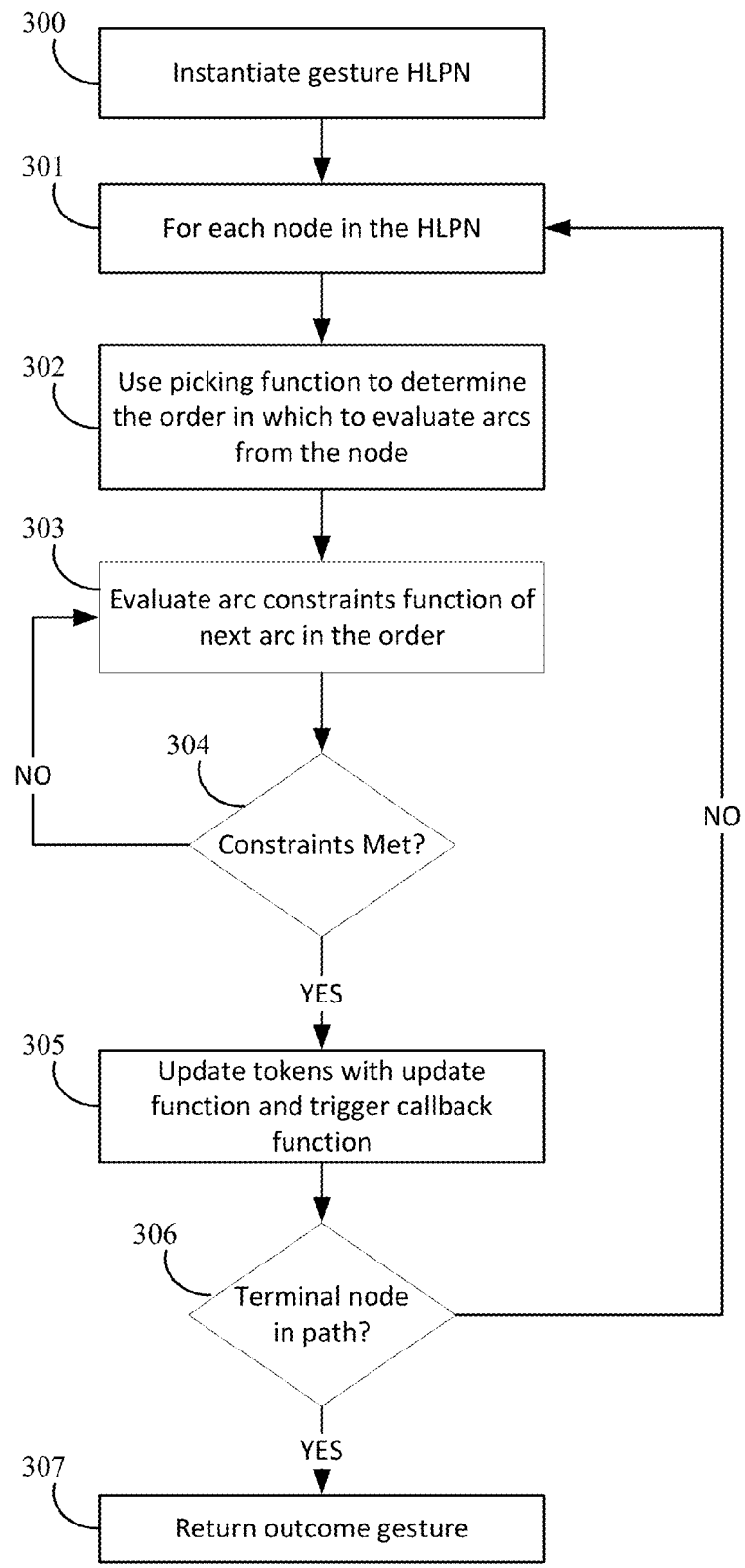
FIG. 3 shows an example process flow for instantiating and executing an HLPN definition for discerning and processing a gesture.

It should be noted that FIG. 3 shows three input devices 101, 102, and 103. The use of three input devices is indicative of the fact that a gesture may be composed of input from multiple devices and/or multiple device types. The use of three input devices is not intended to limit the component environment to any particular number of input devices.

In some implementations, gesture interpreter 100 may, instead of communicating with input devices 101-103 directly, interact with intermediate software layers provided by the operating system (OS) 110 of a device with which input devices 101-103 are connected or integrated. Examples of operating systems include Microsoft Windows®, Apple iOS®, and Google Android®. OS 110 may include device drivers 111 that communicate sensor data to the software layers of the device.

A "device driver" 111 operates or controls a particular type of device that is attached to a computer. A device driver 111 provides a software interface to hardware devices, enabling operating systems and other computer programs to access hardware functions without needing to know precise details of the hardware being used. A device driver 111 typically communicates with the device through the computer bus or communications subsystem to which the hardware connects. When a calling program invokes a routine in the device driver, the device driver 111 issues commands to the input device 101-103. Once the device sends data back to the device driver 111, the driver may invoke routines in the original calling program. Device drivers are generally hardware-dependent and specific to the OS 110.

Gesture interpreter 100 may also interact with one or more application programming interfaces (APIs) 112 that may be provided by or accessible through the OS 110. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API and related components may be stored in one or more computer readable storage media.

Gesture interpreter 100 may call functions in event APIs 112, which in some cases may provide coarser-grained or higher-level capabilities than OS 110 or device driver 111 functions. For instance, the device driver 111 that communicates with a multi-touch display input device may process low-level sensor information about the distortion of the sensor's electrostatic field when a finger or other electrical conductor contacts the display. The OS 110 may determine that that distortion perceived by the device driver 111 is significant enough to register as a "touch" for the purposes of the OS functions. OS 110 may then notify other software layers of the "touch" event by exposing an event API 112 that allows interested software layers to subscribe to significant events occurring on input devices like the multi-touch display. When significant events occur, the events are published and the subscribing software layers, in this case the gesture interpreter 100, are notified.

While interpreting a gesture from input from one or more input devices, gesture interpreter 100 may also communicate with components in the application layer 120. The application layer 120 contains other software layers, such as applications or other APIs or frameworks, that perform user-oriented activities on the device. Some familiar examples of applications in the application layer 120 are email applications, word processors, and spreadsheet applications. In some cases an application layer 120 may include an intermediate layer that makes certain capabilities easier or accessible to application software. An example is the Microsoft® .NET Framework, which acts as an intermediate component within the application layer 120 to make software written across multiple device types more uniform.

The activities and capabilities that may be part of a gesture interpreter 100 will be discussed in more detail in later figures and accompanying text. In general, however, gesture interpreter 100 may communicate with software in the application layer 120 by, for example, exposing API functions that allow software in the application layer 120 to be informed when gestures have been discerned and/or at relevant points of feedback within the gesture. For example, say that software in the application layer 120 would like to be notified when a "swipe" (the "outcome gesture") is performed on the device's multi-touch display. The software would also like to be notified when the "move" phase of the swipe action is occurring so that it can show a directional arrow of the swipe. The gesture interpreter 100 may expose one or more API functions that may be called by the application layer 120 software to indicate that the software would like to be notified of these happenings.

In FIG. 1, examples of two types of applications within the application layer 120 that may make use of the capabilities provided by the gesture interpreter 100 are shown. The first type, an application with a user interface (UI) responsive to gestures 121, is illustrative of the software example immediately above relating to the swipe gesture. This kind of application includes nearly any user-oriented application, including email applications, to-do list applications, etc.

In some cases, gesture interpreter 100 includes the ability to design new gestures or gesture models. In some cases, software in the application layer 120 may provide an interface with which to design or model new types of gestures. A gesture design application 122 may, for example, be capable of designing new gestures graphically or visually, and may call API functions to instruct the gesture interpreter 100 to model the new gesture. In some cases, the gesture interpreter 100 contains a library of gestures that have been developed by third parties using such tools.

According to certain implementations, gesture interpreter 100 uses high-level "Petri Nets" to achieve a formal mathematical representation of a given gesture model that may execute to perform gesture discernment and processing.

A Petri Net is a type of state transition model which can be helpful to represent a system's possible state changes as the system responds to events or input. One advantage of a Petri Net is that it formally represents all possible state changes in the system in response to varying input. Hence, a Petri Net is mathematically sound. A Petri Net includes a definition (or specification) and an execution model.

Embodiments described herein define particular high-level Petri Net models that execute in specific technical environments to coordinate and process gesture-related input from various input devices.

Figure 2A:
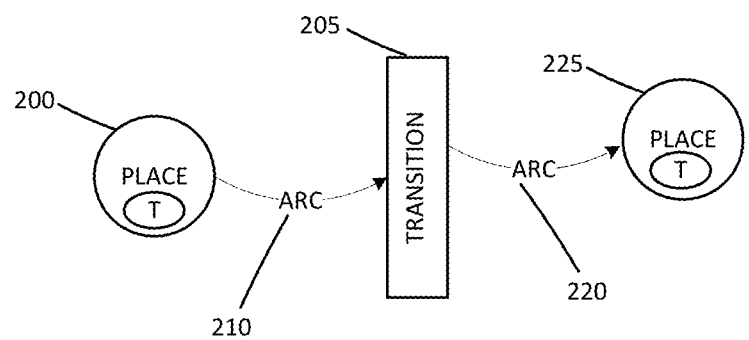
FIGS. 2A-2B show examples of processing in a Petri Net Graph.

A Petri Net is usually described using its graphical representation. The graphical representation of a Petri Net is sometimes called a Petri Net Graph. FIG. 2A shows a very simple example of a generic Petri Net Graph. To briefly summarize, a Petri Net includes states, sometimes known as "places" 200, 225 which are joined to "transitions" 205 by "arcs" 210, 220. Places 200 and transitions 205 are both a type of "node," which are the vertexes of a Petri Net Graph. During the execution of the Petri Net, each "place" 200, 225 in the Petri Net is "marked" with one or more data elements called "tokens" T. Each place accepts tokens of a specified token definition that defines the structure of the token's data elements. A transition 205 takes as input a state of the place 200 it was joined to, and in some cases alters the system state, transitioning it to another place 225, or in some cases back to the prior place with possibly different token values. In other words, a place 200, 225 may contain one or more tokens T, which are "consumed" during a transition 205; the transition 205 yields one or more new tokens T to the next place 225 indicated by the output arc 220.

Connections between nodes are indicated by "arcs," which are represented in the Petri Net Graph as arrows (e.g., 210, 220), but which are defined mathematically as functions. Each node (i.e., place or transition) may have multiple input arcs and multiple output arcs, though only one of each is shown in FIG. 2A. An Input arc 210 to a node indicates the possible paths taken to arrive at the node from other nodes, and an output arc 220 indicates the possible paths taken to leave the node and enter other nodes. An arc 210, 220 defines the conditions under which a particular state transition may occur as the system "moves" from place to place. Here, "move" is used primarily figuratively, as the "motion" of the system is the transition of the system from state to state. To put it another way, a Petri Net represents a system by showing the transition of states over the life of the system as the system executes under different conditions.

In a standard Petri Net, the state of the system is represented with simple, lower level data types (e.g., integer values). A high-level Petri Net (HLPN), such as used in the described implementations, is a type of Petri Net that allows tokens having complex data types to be associated with the places in the net. An HLPN also allows more complex conditions to be associated with an arc (the association of conditions with an arc are sometimes called "arc annotations").

Certain techniques and systems described herein define a particular type of HLPN, which is a variation of a Predicated Transitions Net (PrT Net), that has a particular model for arc functions, token definitions associated with the types of input device, and a picking algorithm for discerning the processing order for arcs. Implementations of this HLPN model create distinct gesture HLPNs for different kinds of gestures discerned and processed by the gesture interpreter 100. Of course embodiments are not limited to the PrT Net-type HLPN. For example, Coloured Petri Nets (CPN) may be used.

As noted, each arc is defined as a function F denoting constraints. Each function F is defined as a tuple of functions such that F=(B, U, C, R). The tuple B, U, C, and R describe the conditions for selecting a particular arc's path to the next node as well as the functions that will occur after it has been selected. The characteristics of B, U, C, and R, are described below, but it should be noted for clarity that B, U, C, and R denote a function specification or template. A given implementation of an HLPN for a specific gesture can call different functions and operate differently in the case of each arc function, though the HLPN for the gesture adheres to the overall function template for the model as described. Furthermore, functions in the arc tuple may be null operations for some individual arcs.

B denotes the "arc constraints function" that evaluates to TRUE or FALSE as a precondition of the arc being selected as the path to the next node.

U denotes the "arc update function," which instantiates a code block for setting values to data elements within the current token. For instance, the update function may obtain a next sample of data from the input device (e.g., the current X, Y location of the finger on the multi-touch display device).

C denotes the "arc callback function," which allows the HLPN to have a function callback with conditional IF statements, local variable assignments, and calls to external functions. If no callback event is provided, a default generic callback event may be called. The callback function may provide, for instance, the capability of application layer 120 software to receive notifications of gesture events from a gesture interpreter 100, both during execution of the gesture and at the gesture's termination or final outcome.

R denotes the "arc priority function" that instantiates a code block for the purpose of assigning an arc priority value to the arc.

The priority value is used by the "picking function" to discern the highest-priority arc to process when multiple arcs exit a node. Picking the next transition or place for the case when there is only one possible arc is trivial. However, when there are multiple arcs, a function to pick the next one to check may be important.

Some implementations may use a "picking" function that combines random selection with the use of priority functions. This picking function may compute the priority function for arcs leading from a node, sort them by ascending value, and then group them if the values are equivalent (e.g., G1=10, 10, 10, G2=1, 1). Selection between nodes with equivalent priorities is chosen at random among the members of the highest-ranking group (e.g., one of the nodes of G1 with priority value 10 will be randomly chosen first). In some cases, an arc priority function can be undefined, and the arc priority for an undefined arc priority function is zero. In these cases, the picking function can randomly select between arcs of priority value zero. Naturally, other picking functions are possible and may be appropriate in other implementations.

Some implementations may use parallel processing so that multiple paths may be traversed simultaneously. This may be advantageous when multiple processing units are available, when nodes are expensive to traverse due to complex constraints, or when data from input devices arrive sporadically or asynchronously.

Figure 2B:
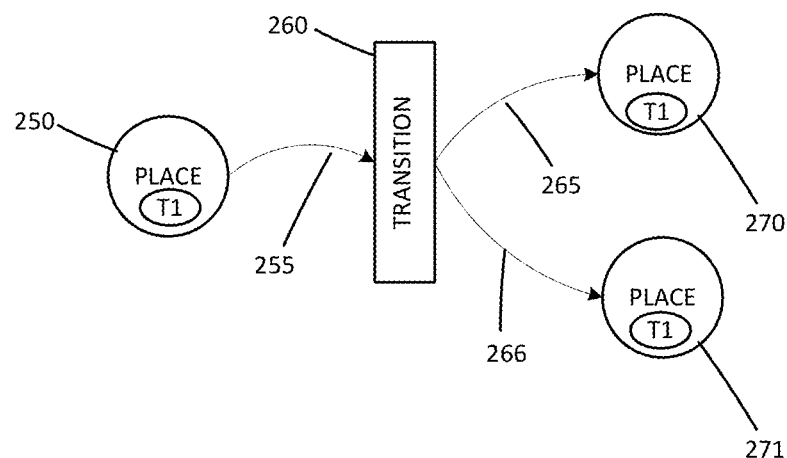

FIG. 2B shows an example of parallel processing. In FIG. 2B, place 250 having a token T1 moves via arc 255 into transition 260. Transition 260 can create multiple identical copies of the token T1 based on the original and effectively pass the tokens to two places 270, 271 simultaneously via two output arcs 265, 266. Processing using identical token data may then proceed in parallel along two paths. Since an HLPN is mathematically sound, a single definitive outcome will emerge, even when the nodes are traversed in parallel.

FIG. 3 shows an example process flow for instantiating and executing an HLPN definition for discerning and processing a gesture. Techniques expressed by the process flow may be appropriate for implementation in a gesture interpreter 100, described with respect to FIG. 1.

In FIG. 3, a "gesture HLPN," i.e., an HLPN that describes the discernment and processing for a particular set of actions, movements, or events that make up a gesture, is instantiated (300). The general description of a gesture HLPN was described above with respect to FIG. 2, and includes token definitions, places, transitions, arcs and their associated function tuple, and a picking function. In other words, to design a gesture HLPN for a given gesture, places are defined and associated with specific tokens that capture data relevant to the type of input devices that provide action primitives to the gestures. Transitions are also described that show the transitions from state to state. Arcs and their associated function tuples describe the "path" of possible states through the system to ultimately arrive at a gesture outcome through the gesture HLPN. Note that a detailed example of an HLPN for a multi-touch display device is described below with respect to FIGS. 4A-4B.

Instantiating the gesture HLPN (300) occurs when, in response to receiving activation input data from an input device, a gesture HLPN is initialized by having tokens associated with places (sometimes referred to as "marking" the HLPN). The tokens initially contain data values appropriate to the types of input devices and types of gesture action primitives that the gesture HLPN is designed to discern and process.

Having instantiated the gesture HLPN, the gesture HLPN may now be "executed." The gesture HLPN is executed by traversing the nodes (places and transitions) of the HLPN in a given path until termination of the nodes in the path, which describes a final gesture outcome. The objective of executing the gesture HLPN is to apply appropriate transitions to the state at important junctures, update the state with new information from input devices when appropriate, and arrive at a final determination as to the outcome gesture for the particular set of actions and movements taken by the user and/or events of the input device. Note that in some cases, all the nodes in a given HLPN might not be traversed, as the path traversed through the nodes is determined by the token data and function outcomes at each possible path.

For each node in the HLPN for a path being traversed (301), several processing steps may be performed. Initially, the picking function may be applied to determine the order in which to evaluate arcs from the node (302). The picking function may perform this operation by calling the priority function of each arc emerging from the node, and then ranking the priority values. The picking function may in some cases choose randomly between arcs of equivalent priority. For example, the priority function may not be defined (or may be defined to equivalent priorities of 0), resulting in the picking function picking randomly between the arcs. This aspect was described in more detail above in reference to the definition of a picking function.

Figure 4B:
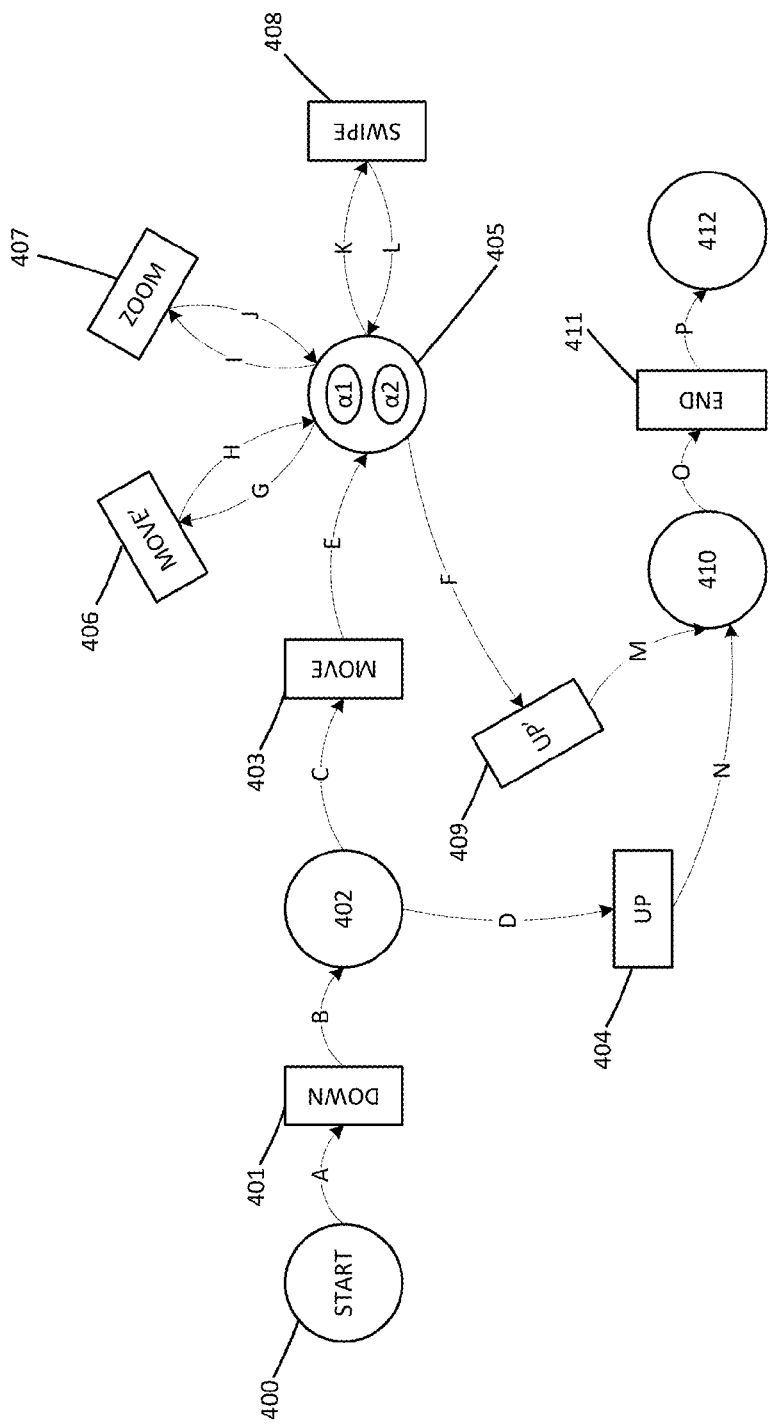

Having ordered the output arcs on a node, the arc constraints function can be evaluated for the next arc (here, the first arc) in the order (303). The arc constraints function is determinative of whether conditions for taking a particular path out of a node have been met. The precise requirements in a given arc constraints function are determined by the gesture design. For example, a "zoom" motion often requires two fingers to be on a multi-touch display. Thus, a condition for determining a "zoom" motion may require two tokens, each one representing an individual finger trace on a multi-touch display, to be present in a place. Unless two tokens are in the place, the "zoom" transition may not be called. A detailed example of arc constraints function processing is shown in FIG. 4A-4B.

Constraints are tested as described above (304). If constraints are not met (NO), then the arc constraints on the next arc in the order (303), as determined by the picking function, are tested.

If the constraints are met (YES), then that particular arc is chosen, meaning that processing for the arc executes by calling the arc update function and triggering the arc callback function (305). As noted with respect to FIG. 2A, the arc update function may in some cases retrieve additional samples of data from an input device to update values in the token(s) associated with a place. For example, a new sample may indicate that the position of a user's finger on a multi-touch display has moved to a new location and the x, y coordinates of the finger may be updated accordingly in the token.

An arc callback function may also be triggered with respect to the arc. As noted with respect to FIG. 2A, an arc callback function may allow for additional processing and may provide, for instance, the capability of application layer 120 software to receive notifications of gesture events both during execution of the gesture and at the gesture's termination or final outcome.

If the node being traversed is a terminal node (306), i.e., the last node in a given path for traversing the gesture HLPN, then a final outcome gesture is determined by the path and returned (307). In some cases, the final state of a token arriving at the terminal node may represent the outcome gesture, and in some cases the arc callback function on the arc leading to the final node may indicate to software in the application layer 120 that an outcome gesture has been determined in this instance.

If the node being traversed is not a terminal node in the path being traversed, then execution of the gesture HLPN continues with the next node (306 returning to 301).

Example: Multi-Touch Display Device Gesture Processing

One example implementation of techniques and systems described herein is appropriate to gesture processing for multi-touch displays. Multi-touch displays (e.g., a touch panel of a tablet or display) may be capacitive, resistive, heat-based, or infra-red based as some examples. In some cases, camera tracking may be used. Furthermore, some multi-touch displays may also be vision-based, such as Microsoft® PixelSense or even a device that tracks eye movements such as Google® Glass. This example specifically discusses capacitive multi-touch displays, but the techniques discussed in this example may also be applied to gestures detectable from eye movements tracking devices or other kinds of multi-touch input devices, particularly when they are analogous to finger-based gestures.

Implementation includes a specific gesture HLPN, including token definitions appropriate to multi-touch display gesture processing; places that have tokens; transitions; arcs with pre- and post-condition functions appropriate to the display; and a picking function for determining the arc traversal priority.

In this example implementation, a capacitive multi-touch display can detect multiple finger strokes at the same time. A "trace" is generated when a finger touches down onto the surface, moves (or stays static), and is eventually lifted from the surface. Therefore, a trace is a set of touches or actions that are part of a continuous stroke. A set of traces may define a gesture. For example, a simple gesture on a multi-touch display may be two fingers moving on the same path, creating a swipe. Another example gesture is the "zoom out," when two fingers are detected as moving away from one another. Another example gesture is the "zoom in," in which two fingers are detected as moving toward one another.

A token is the data structure for capturing system state in the gesture processing system. In some implementations, a single token definition may sufficiently represent the necessary unit of gesture processing. Here, a token represents the action of a single finger trace. Turning first to the definition of the token T=TK for this example implementation, FIG. 4A describes an example token definition. The description in FIG. 4A shows several data elements and a textual description of their meaning.

The gesture processing system can assign, for example, an "id" or unique identification code. Depending on the implementation, the "id" may be a unique number or consecutive integer assigned while the system is operating. The "tid" may denote an identifier within a particular gesture processing instance, for example representing the individual movements such as traces or finger strokes that compose the gesture.

Display coordinates, i.e., the location of the touch or action on the virtual space of the multi-touch display, are given by "x" (for the horizontal coordinate) and "y" (for the vertical coordinate). The "state" variable represents the current mode of the token. In this example, the state variable has one of several discrete values such as DOWN, MOVE, and UP.

The "holdTime" tracks how many milliseconds have elapsed since the generation of the token, so that it may be determined if the finger has remained static at the current position on the display. Note that, since the token in this implementation represents a trace rather than a movement, if a touch interaction is not moving or is not moving beyond a threshold amount, it will not create additional samples but increment the holding time of the finger.

In some cases, the ability to obtain a history of prior token states may be relevant to an implementation. Depending on the implementation, a previous history of token states may be stored within the token, or it may be stored in a buffer accessible through a function. The token definition in this example includes a reference "prev" to the token describing the previous sample. This example token data structure includes a pointer function "get(Time t)" to access a previous history of token states at a particular time "t" contained in a buffer of size "tSize".

It should be noted that the token definition depicted in FIG. 4A is exemplary only and is not intended to limit either multi-touch display device gesture processing, or gesture input device processing in general, to a specific token definition.

Take, for example, an interaction that has two possible gestures using two fingers: "swipe" and "zoom". FIG. 4B shows an example HLPN "graph" (a graphical representation of the HLPN's mathematical expression) for processing the two possible gestures of the multi-touch display device. A swipe implies that the user moves two fingers in any direction. In the case of "zoom," zoom-in and zoom-out could be modeled separately, but are modeled together in FIG. 4B.

FIG. 4B shows places denoted by circular elements; transitions denoted by rectangular elements that are labeled for clarity to indicate the transition; arcs represented by directional arrows (labeled with letters); and two tokens ($\alpha 1$ and $\alpha 2$), representing two active traces in place 405. FIG. 4B is described with reference to Table 1, which contains more detailed descriptions of activities occurring with respect to each arc. Table 1 shows each arc expression with the Boolean condition function and other relevant information. In Table 1, TK denotes a generic token of a given definition, of which $\alpha 1$ and $\alpha 2$ are instances.

TABLE 1

| Arc | From | To | Condition | Token Count |
|---|---|---|---|---|
| A | 400 | DOWN | TK.state == DOWN | 1 |
| B | DOWN | 402 | update(TK) | 1 |
| C | 402 | MOVE | TK.state == MOVE | 1 |
| D | 402 | UP | TK.state == UP | 1 |
| E | MOVE | 405 | update(TK) | 1 |
| F | 405 | UP' | TK.state == UP | 1 |
| G | 405 | MOVE' | TK.state == MOVE | 1 |
| H | MOVE' | 405 | update(TK) | 1 |
| I | 405 | ZOOM | TK.state == MOVE && IsZoom($\alpha 1, \alpha 2$) | 2 |
| J | ZOOM | 405 | Update($\alpha 1, \alpha 2$) | 2 |
| K | 405 | SWIPE | TK.state == MOVE && IsSwipe($\alpha 1, \alpha 2$) | 2 |
| L | SWIPE | 405 | Update($\alpha 1, \alpha 2$) | 2 |
| M | UP' | 410 | TK.state == UP | 1 |
| N | UP | 410 | TK.state == UP | 1 |
| O | 410 | END | true | 1 |
| P | END | 412 | true | 1 |

The system begins with an empty initial marking (no tokens) awaiting an action to be registered on the gesture input device. Once the user touches down onto the surface, tokens are created (e.g., based on available token definitions) and placed in START 400. Many multi-touch display devices would initiate by registering a finger on the display, so given that the tokens will start with a DOWN state, they will move from place 400 into place 402, using arcs A and B to move through transition 401. Arc A consumes the token, and arc B updates the token with the next touch data sample into place 402. Once in place 402, since the token was updated with the next touch sample, the system infers the next transition using the constraints provided. It has two options, either arc C or arc D. If the token's state is MOVE, each token is moved into place 405 using arc E, and another updated touch data sample is taken.

FIG. 4B shows the system at this time, with both tokens α1 and α2 (each representing a finger trace) at place 405. The system infers the next transition (406, 407, 408, or 409) by using the picking algorithm to determine which arc (F, G, I, or K) has priority. For this example, assume that MOVE' 406, ZOOM 407, SWIPE 408, and UP' 409 each have priority functions that calculate to values 1, 10, 10, and 2, respectively. This means that the group with ZOOM and SWIPE are the first to be checked for constraints, since they have the highest values. Using the picking algorithm, the system will randomly choose one of the two equivalent-priority arcs and check the arc's constraints function to see if it can be enabled (or "fired").

Assume, for example, that the picking function determines that SWIPE 408 should be checked to see if the constraints are met. In the example in FIG. 4B, at place 405, evaluating arc K, the constraints include a TRUE return from the Boolean function "IsSwipe (α1, α2)" (the arc's definition of the function B pre-condition), which accepts two tokens and returns TRUE or FALSE. The constraints are true if two tokens are in place 405, both tokens are in state MOVE, and the function IsSwipe returns TRUE. If the constraints are met, the callback function indicating a SWIPE 408 transition has occurred will be called. The callback function may, for example, indicate the direction of the swipe and pass a copy of the token data for use by the application layer. The token data will then be updated to the next sample via an update function associated with arc L. This brings back both tokens into place 405.

Alternatively, during execution of the system, ZOOM 407 may be chosen by the picking function and arc I may be evaluated. If arc I's constraints have been met, i.e., if the state of both tokens is MOVE and the IsZoom(α1, α2) evaluates to TRUE, then the callback function indicating a ZOOM 407 transition has occurred will be called. The callback function will pass a copy of the token data for use by the application layer. The token data will then be updated to the next sample via an update function associated with arc J. This brings back both tokens into place 405.

Alternatively, during execution of the system, likely because constraints on higher-priority arcs are not met, MOVE' 406 may be chosen by the picking function and arc G may be evaluated. Arc G's constraints have been met if the state of the token is MOVE. There is no Boolean function constraint, hence MOVE' 406 may represent a fallback state when one or both fingers are moving, but neither are moving in a discernable SWIPE or ZOOM motion (e.g., the fingers are not moving together, only one finger is moving, or both fingers are not moving towards or away from one another). A callback function may be called which may pass a copy of the token data. The token data will then be updated to the next sample via an update function associated with arc H, which brings the token(s) back to place 405.

Eventually, from place 405, a finger may be lifted from the multi-touch display device. When that occurs, a token α1 and/or α2 will have the UP state, and the token(s) will move via arc F into transition UP' 409, and then to place 410 via arc M. The system may also arrive at place 410 via arc N, for example if a finger was initially lifted from place 402 without ever having been moved. In that case, the system would have moved through transition UP 404 to arrive at place 410. From place 410, arc O, which has no constraints, moves the system through transition END 411, which consumes the final token and executes necessary operations for final token state 412. Node 412 represents the terminal node for the path.

Example: Multiple Gesture Input Devices

One example implementation of techniques and systems described herein may be appropriate to gesture processing for multiple input devices. This example shows the advantages of the techniques and systems by showing the ease of modeling, discerning, and processing gesture models with multiple input devices.

Consider, for example, a gesture that is determined from a combination of action primitives across multiple input devices, a "back-tilted swipe". This hypothetical gesture requires both a "swipe" gesture involving two fingers and that the device be tilted such that the bottom of the device is higher than the top of the device at an angle of more than 30 degrees of horizontal. In such an example, the tilt may be determined from the state of the gyroscope input device on the device, and the "swipe" gesture may require input from the multi-touch display input device.

To address this example, the gesture HLPN described in FIGS. 4A-4B for the multi-touch display is simply modified by including a new token definition for the gyroscope, an additional place associated with the new token definition for the gyroscope, and an additional transition called "BACK-TILTED SWIPE." Modifications to the HLPN also include appropriate arcs for connecting the new nodes and their associated arc functions.

The new token definition for the gyroscope input device may include a data element indicating the position of the gyroscope in degrees. The new place GYRO may be associated with tokens of the "gyroscope" type.

The new gesture can be integrated with the HLPN in FIG. 4B by connecting the new GYRO place to the SWIPE transition 408 with an arc. GYRO is given a token β1, indicating the state of the gyroscope. Connected to GYRO by a new arc might be the new transition BACK-TILTED SWIPE. The new arc may have an arc constraints function requiring that the gyroscope token have data indicating a reading of 30 degrees or more. BACK-TILTED SWIPE might be connected with an output arc leading directly back to place 405. Naturally, other implementations are possible.

Figure 5:
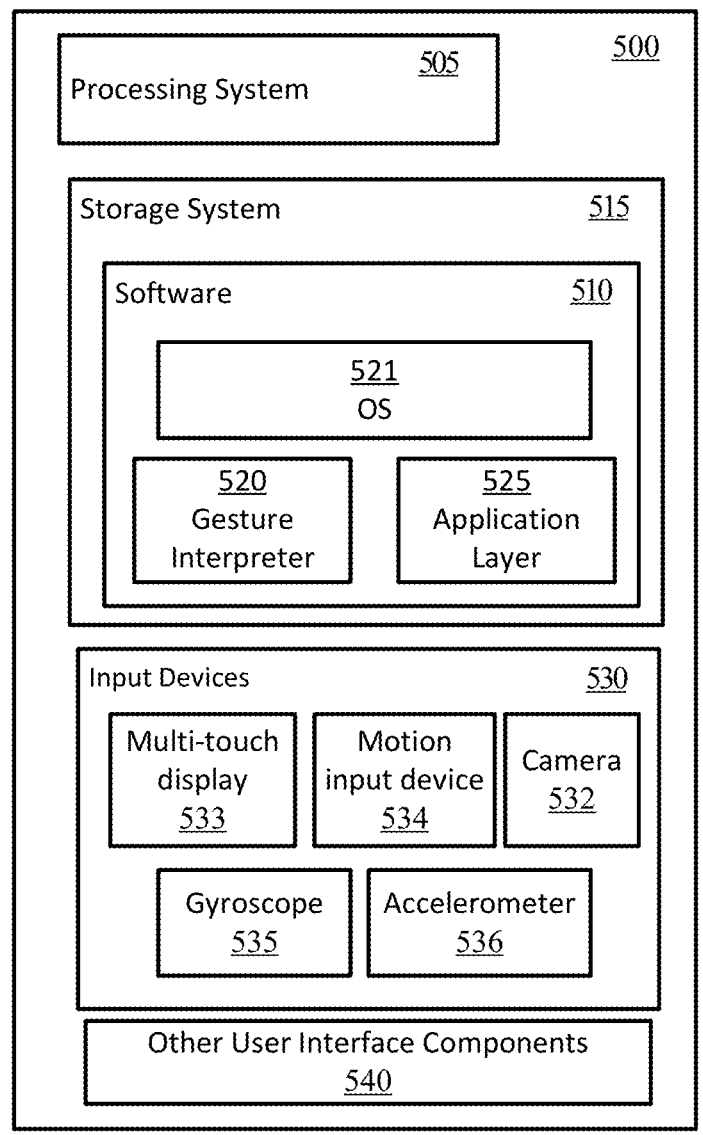
FIG. 5 shows a block diagram illustrating components of devices and systems that may be used to implement the techniques described herein.

FIG. 5 shows a block diagram illustrating components of devices and systems that may be used to implement the techniques described herein.

Referring to FIG. 5, device 500 may represent a computing device such as, but not limited to, a personal computer, a tablet computer, a reader, a mobile device, a personal digital assistant, a wearable computer, a smartphone, a laptop computer (notebook or netbook), a gaming device or console, a desktop computer, or a smart television. Accordingly, more or fewer elements described with respect to device 500 may be incorporated to implement a particular computing device.

Device 500, for example, includes a processing system 505 of one or more processors to transform or manipulate data according to the instructions of software 510 stored on a storage system 515. Examples of processors of the processing system 505 include general purpose central processing units, application specific processors, and logic devices, as well as any other type of processing device, combinations, or variations thereof.

The software 510 can include an operating system 521 and components such as a gesture interpreter 520 and application layer software 525 (100 and 120 of FIG. 1, respectively). The gesture interpreter 520 may implement aspects of systems and techniques herein, and software in the application layer 525 may interact with the gesture interpreter 520 to discern and process gestures. Software in the application layer may include user oriented applications that wish to process gestures and gesture design applications (121 and 122 of FIG. 1, respectively).

Device operating systems 521 generally control and coordinate the functions of the various components in the computing device, providing an easier way for applications to connect with lower level components like input devices or capabilities. An OS 521 may provide device drivers (111, described with respect to FIG. 1) for communicating with input devices and assisting in the interchange of data between the input devices 530 and other software layers. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system 521 may be implemented both natively on the computing device and on software virtualization layers running atop the native device operating system (OS). Virtualized OS layers, while not depicted in FIG. 5, can be thought of as additional, nested groupings within the operating system space, each containing an OS, application programs, and APIs.

Storage system 515 may comprise any computer readable storage media readable by the processing system 505 and capable of storing software 510, including the gesture interpreter 520.

Storage system 515 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In no case do storage media consist of a propagated signal or carrier wave. In addition to storage media, in some implementations, storage system 515 may also include communication media over which software may be communicated internally or externally.

Storage system 515 may be implemented as a single storage device but may also be implemented across multiple storage devices or sub-systems co-located or distributed relative to each other. Storage system 515 may include additional elements, such as a controller, capable of communicating with processor 505.

Software 510 may be implemented in program instructions and among other functions may, when executed by device 500 in general or processing system 505 in particular, direct device 500 or the one or more processors of processing system 505 to operate as described herein for gesture discernment and processing.

In general, software may, when loaded into processing system 505 and executed, transform computing device 500 overall from a general-purpose computing system into a special-purpose computing system customized to perform gesture discernment and processing as described herein for each implementation. Indeed, encoding software on storage system 515 may transform the physical structure of storage system 515. The specific transformation of the physical structure may depend on various factors in different implementations of this description. Examples of such factors may include, but are not limited to the technology used to implement the storage media of storage system 515 and whether the computer-storage media are characterized as primary or secondary storage.

The storage system 515 can further include a gesture store containing HLPN models for a plurality of gestures. The gesture store may be one or more files or databases containing graph models, function definitions, data structures, or other information used by the gesture interpreter 520 to perform gesture discernment and processing.

The device 500 can further include input devices 530 which may enable different types of actions, movements, or events to be detected for use by the gesture interpreter 520. Input devices can include, for example, a camera 532 for detecting visual input, a multi-touch display device 533 for receiving a touch gesture from a user, and a motion input device 534 for detecting non-touch gestures and other motions by a user. Input devices may also include a gyroscope 535 and an accelerometer 536. These input devices are exemplary only.

Other user interface components 540 may include other input components such as a mouse, keyboard, and display. Other user interface components 540 may also include output devices such as display screens, speakers, haptic devices for tactile feedback, and other types of output devices. In certain cases, the input and output devices may be combined in a single device, such as a touchscreen display which both depicts images and receives touch gesture input from the user. Visual output may be depicted on the display in myriad ways, presenting graphical user interface elements, text, images, video, notifications, virtual buttons, virtual keyboards, or any other type of information capable of being depicted in visual form.

Other user interface components 540 may also include user interface software and associated software (e.g., for graphics chips and input devices) executed by the OS in support of the various user input and output devices. The associated software assists the OS in communicating user interface hardware events to application programs using defined mechanisms. The user interface system 530 including user interface software may support a graphical user interface, a natural user interface, or any other type of user interface.

A communication interface (not shown) may be included, providing communication connections and devices that allow for communication between device 500 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of device 500 may be included in a system-on-a-chip (SoC) device. These elements may include, but are not limited to, the processing system 505 and elements of the storage system 515.

Computing device 500 is generally intended to represent a computing system on which software is deployed and executed in order to implement a gesture interpreter 520 and associated functions. In some implementations, components of the system may be present on separate devices, e.g., a gesture interpreter 520 may be stored and executed on one instance of device 500, while input devices are connected to different instances of device 500. Such an implementation might be applicable when, for example, processing for the gesture interpreter 520 is distributed across multiple processing units. Such an implementation might also be applicable when the gesture interpreter 520 uses input data from multiple input devices that may be connected separately to multiple devices 500. In such cases, communication between devices or components may occur over networks or communications channels using communications interfaces as described.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
   one or more input devices;
   one or more non-transitory computer readable storage media;
   a processing system;
   program instructions for a gesture interpreter stored on the one or more non-transitory computer readable storage media that direct the processing system to, in response to receiving an activation input data from at least one input device of the one or more input devices:
   instantiate a high-level Petri Net instance having:
      one or more tokens, each token having a token definition appropriate to an input type of the input device from which the activation input data is received;
      a plurality of nodes, the plurality of nodes comprising:
         one or more places, each place representing a gesture state and each place having at least one associated token that includes input data received through a device driver from the input device; and
         one or more transitions, each transition representing a possible action on the input device;
      one or more arcs connecting between the nodes, wherein each arc identifies a possible route for a token instance to take between nodes, and wherein each arc is expressed as a tuple comprising an arc constraints function, an arc update function, an arc priority function, and an arc callback function for executing further processing including processing by an application layer; and
      a picking function that uses the arc priority function to evaluate the calculation priority among the one or more arcs from the same place or transition;
   execute the high-level Petri Net instance by, for each node in a path being traversed:
      determining, using the arc picking function, an order in which to evaluate arc constraints;
      evaluating the arc constraints function of a first arc in the order in which to evaluate the arc constraints;
      when the arc constraints of the first arc are met according to the arc constraints function of the first arc, updating the one or more tokens associated with the node by calling the arc update function of the first arc to obtain updated input data, trigger the arc callback function of the first arc, and traverse the next node in the high-level Petri Net instance indicated by the first arc; and
      when the arc constraints of the first arc are not met according to the arc constraints function of the first arc, evaluating the arc constraints function of the next arc in the order in which to evaluate the arc constraints; and
   return to the application layer an outcome gesture indicative of a terminal node in the path being traversed,
   the transition being configured to take a state of a prior place of the one or more places, alter the state, and then transfer it to another place or back to the prior place.

2. The system of claim 1, wherein the input type of the at least one input device includes a multi-touch display device.

3. The system of claim 2, wherein the token definition comprises display coordinates and touch states for the multi-touch display device.

4. The system of claim 1, wherein the input type of the at least one input device includes a full-body gesture input device.

5. The system of claim 1, wherein the picking algorithm randomly selects between arcs of equivalent priority.

6. The system of claim 1, wherein the token definition comprises a function to access a history of prior token states.

7. The system of claim 1, wherein nodes in a path are traversed in parallel.

8. One or more non-transitory computer readable storage media comprising instructions stored thereon that when executed by a processing system direct the processing system to:
   in response to receiving an activation input data from an input device:
   instantiate a high-level Petri Net instance having:
      one or more tokens, each token having a token definition appropriate to an input type of the input device from which the activation input data is received;
      a plurality of nodes, the plurality of nodes comprising:
         one or more places, each place representing a gesture state and each place having at least one associated token that includes input data received through a device driver from the input device; and
         one or more transitions, each transition representing a possible action on the input device;

one or more arcs connecting between the nodes, wherein each arc identifies a possible route for a token instance to take between nodes, and wherein each arc is expressed as a tuple comprising an arc constraints function, an arc update function, an arc priority function, and an arc callback function for executing further processing including processing by an application layer; and a picking function that uses the arc priority function to evaluate the calculation priority among the one or more arcs from the same place or transition;

execute the high-level Petri Net instance by, for each node in a path being traversed:

determining, using the arc picking function, an order in which to evaluate arc constraints;

evaluating the arc constraints function of a first arc in the order in which to evaluate the arc constraints;

when the arc constraints of the first arc are met according to the arc constraints function of the first arc, updating the one or more tokens associated with the node by calling the arc update function of the first arc to obtain updated input data, trigger the arc callback function of the first arc, and traverse the next node in the high-level Petri Net instance indicated by the first arc; and when the arc constraints of the first arc are not met according to the arc constraints function of the first arc, evaluating the arc constraints function of the next arc in the order in which to evaluate the arc constraints; and return to the application layer an outcome gesture indicative of a terminal node in the path being traversed, the transition being configured to take a state of a prior place of the one or more places, alter the state, and then transfer it to another place or back to the prior place.

9. The storage media of claim 8, further comprising one or more gesture high-level Petri Nets stored thereon.

10. The storage media of claim 8, wherein the input type of the input device is a multi-touch display device.

11. The storage media of claim 10, wherein the token definition comprises display coordinates and touch states for the multi-touch display device.

12. The storage media of claim 8, wherein the input type of the input device is a full-body gesture input device.

13. The storage media of claim 8, wherein the picking algorithm randomly selects between arcs of equivalent priority.

14. The storage media of claim 8, wherein the token definition comprises a function to access a history of prior token states.

15. A method for facilitating gesture discernment and processing comprising:

receiving an activation input data from an input device;

instantiating a high-level Petri Net instance having:

one or more tokens, each token having a token definition appropriate to an input type of the input device from which the activation input data is received;

a plurality of nodes, the plurality of nodes comprising:

one or more places, each place representing a gesture state and each place having at least one associated token that includes received through a device driver input data from the input device; and one or more transitions, each transition representing a possible action on the input device;

one or more arcs connecting between the nodes, wherein each arc identifies a possible route for a token instance to take between nodes, and wherein each arc is expressed as a tuple comprising an arc constraints function, an arc update function, an arc priority function, and an arc callback function for executing further processing including processing by an application layer; and a picking function that uses the arc priority function to evaluate the calculation priority among the one or more arcs from the same place or transition;

executing the high-level Petri Net instance by, for each node in a path being traversed:

determining, using the arc picking function, an order in which to evaluate arc constraints;

evaluating the arc constraints function of a first arc in the order;

when the arc constraints of the first arc are not met, evaluating the arc constraints function of the next arc in the order; and when the arc constraints of the first arc are met, updating the one or more tokens associated with the place by calling the arc update function of the first arc to obtain updated input data, triggering the arc callback function of the first arc; and when the node is the terminal node in the path being traversed, returning to the application layer an outcome gesture indicative of the terminal node; or when the node is not the terminal node in the path being traversed, traversing the next node in the high-level Petri Net instance indicated by the first arc, the transition being configured to take a state of a prior place of the one or more laces, alter the state, and then transfer it to another place or back to the prior place.

16. The method of claim 15, wherein the input type of the input device is a multi-touch display device.

17. The method of claim 16, wherein the token definition comprises display coordinates and touch states for the multi-touch display device.

18. The method of claim 15, wherein the picking algorithm randomly selects between arcs of equivalent priority.

19. The method of claim 18, wherein the arc priority function for one or more of the arcs is undefined and has an arc priority value of zero.

20. The method of claim 15, wherein the token definition comprises a function to access.

* * * * *